(12) United States Patent  (10) Patent No.: US 9,329,058 B2
Horiguchi et al.  (45) Date of Patent: May 3, 2016

(54) ENCODER THAT DETECTS DISPLACEMENT OF AN OBJECT, AND LENS APPARATUS AND CAMERA HAVING THE SAME

(71) Applicant: CANON KABUSHIKI KAISHA, Tokyo (JP)

(72) Inventors: Haruhiko Horiguchi, Tokyo (JP); Masahiko Igaki, Yokohama (JP); Chihiro Nagura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 344 days.

(21) Appl. No.: 13/871,348

(22) Filed: Apr. 26, 2013

(65) Prior Publication Data

US 2013/0286194 A1  Oct. 31, 2013

(30) Foreign Application Priority Data

Apr. 27, 2012  (JP) .................................. 2012-103984

(51) Int. Cl.
 *G01D 5/347* (2006.01)
 *G02B 7/04* (2006.01)
(52) U.S. Cl.
 CPC .......... *G01D 5/3473* (2013.01); *G01D 5/34707* (2013.01); *G02B 7/04* (2013.01)
(58) Field of Classification Search
 CPC ..... G01D 5/3473; G01D 5/34707; G02B 7/04
 USPC .......... 250/231.13–231.18; 348/135; 359/823
 See application file for complete search history.

(56) References Cited

U.S. PATENT DOCUMENTS

| 6,098,295 | A | 8/2000 | Feichtinger |
| 6,523,268 | B1 | 2/2003 | Boge |
| 6,637,118 | B2 | 10/2003 | Feichtinger |
| 7,003,222 | B1 | 2/2006 | Murakami |
| 2002/0083769 | A1 | 7/2002 | Peterlechner et al. |
| 2006/0028653 | A1* | 2/2006 | Igaki et al. ................... 356/499 |
| 2009/0095892 | A1 | 4/2009 | Summers et al. |
| 2011/0273782 | A1 | 11/2011 | Fukino et al. |

FOREIGN PATENT DOCUMENTS

CN   101166954 A   4/2008
DE   20 2011 005539 U1   8/2011

(Continued)

OTHER PUBLICATIONS

Extended European Search Report for corresponding EP13165307.3, mail date May 9, 2014.

(Continued)

*Primary Examiner* — Seung C Sohn
(74) *Attorney, Agent, or Firm* — Rossi, Kimms & McDowell LLP

(57) ABSTRACT

An encoder (100) includes a cylindrical body (10), a sensor unit (7) configured to detect a displacement of the cylindrical body (10) in a circumferential direction of the cylindrical body (10), and a scale (2) that is attached to the cylindrical body (10) using a holder (12) and a holder (13) and that has a signal detection effective region (14) used to detect the displacement by the sensor unit (7), and a region (17) that has a stiffness smaller than a stiffness of the signal detection effective region (14) in the circumferential direction of the cylindrical body (10) is provided on an outside of the signal detection effective region (14) and on at least one side of the first holder (12) and the second holder (13).

12 Claims, 8 Drawing Sheets

(56) References Cited

FOREIGN PATENT DOCUMENTS

| | | |
|---|---|---|
| EP | 1 211 482 A1 | 6/2002 |
| EP | 1 365 214 A1 | 11/2003 |
| EP | 1211482 B1 | 2/2005 |
| JP | 10206103 A | 8/1998 |
| JP | 2000056207 A | 2/2000 |
| JP | 2002081929 A | 3/2002 |
| JP | 2002081930 A | 3/2002 |
| JP | 2004085840 A | 3/2004 |
| JP | 2011150117 A | 8/2011 |

OTHER PUBLICATIONS

Office Action issued in CN201310145603.6, mailed Feb. 28, 2015. English translation provided.

Office Action issued in Japanese Appln. No. 2012-103984 issued on Dec. 15, 2015.

\* cited by examiner

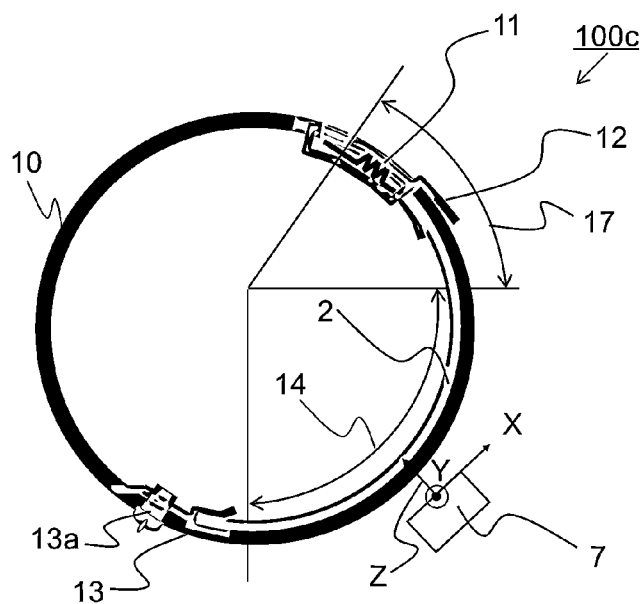
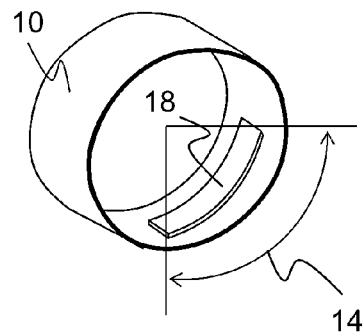
FIG. 5A  FIG. 5B
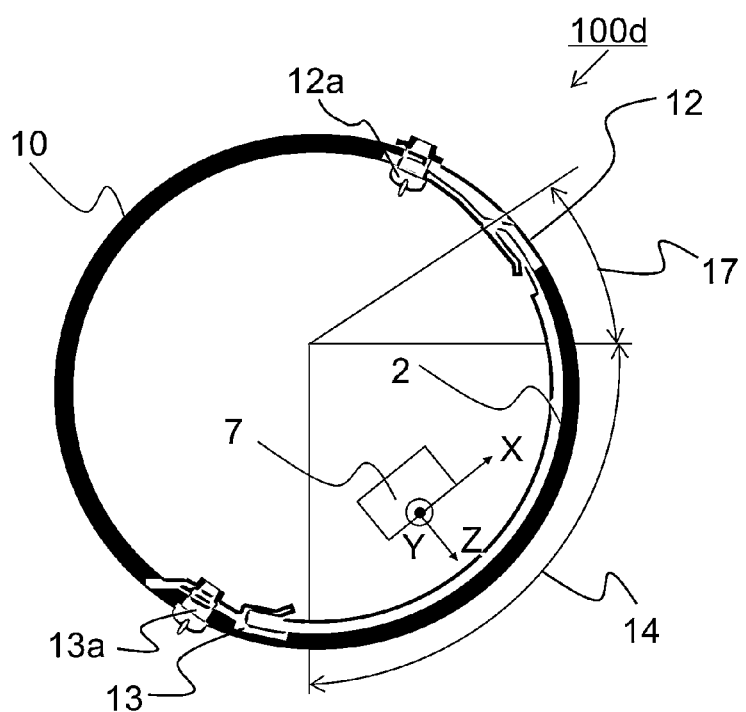
FIG. 6

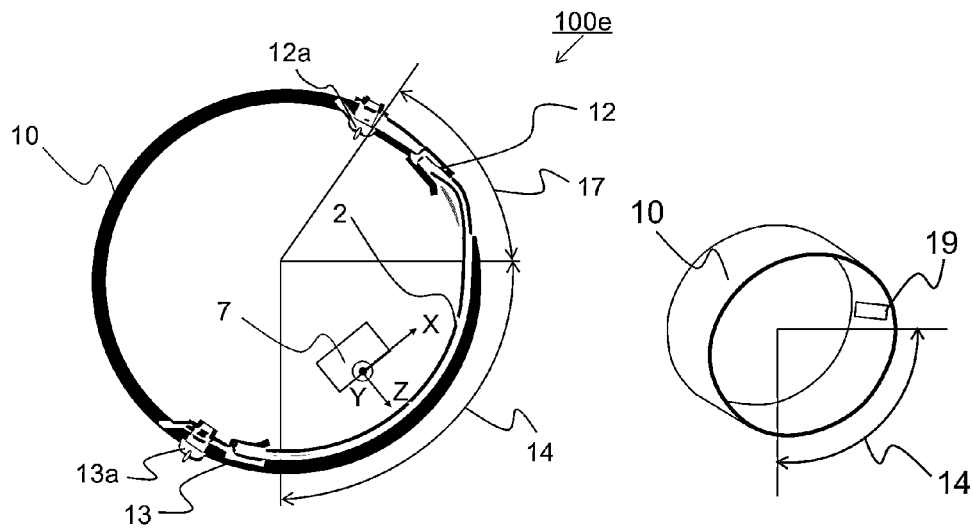
FIG. 9A
FIG. 9B
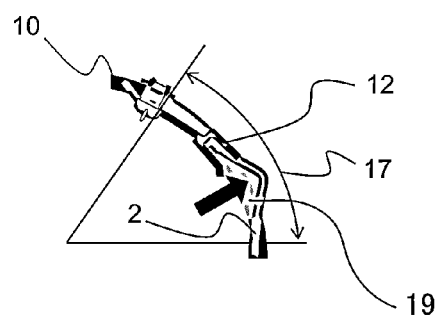
FIG. 9C
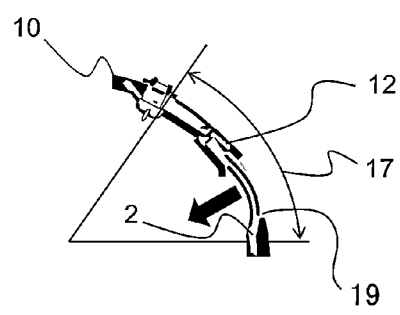
FIG. 9D

ENCODER THAT DETECTS DISPLACEMENT OF AN OBJECT, AND LENS APPARATUS AND CAMERA HAVING THE SAME

BACKGROUND OF THE INVENTION

1. Field of the Invention

The present invention relates to an encoder that detects a displacement of an object to be measured.

2. Description of the Related Art

Previously, as a displacement detection apparatus that detects a displacement such as a moving amount or a rotating amount of an object to be measured, an encoder has been known. As the encoder, there is an optical encoder, a magnetic encoder, or the like. For example, the optical encoder is configured by including a light source, a scale that can be displaced relative to the light source, and a light receiving element that receives light that is reflected on or transmits through the scale. A pattern that reflects or transmits through the light is formed on the scale, and in accordance with the relative displacement of the scale, a light intensity of the light received by the light receiving element is changed. The encoder detects the displacement of the object to be measured based on a detection signal outputted from the light receiving element in accordance with the change of the light intensity.

U.S. Pat. No. 6,637,118 discloses an encoder that includes a cylindrical body and a scale attached to the cylindrical body. In the configuration of U.S. Pat. No. 6,637,118, the scale is held on an inner surface of the cylindrical body, and both ends of the scale are fixed using screw members. A center axis of the screw member that fixes the scale is decentered. Therefore, even when a length of the scale is slightly different from a design value, the scale can be attached to the cylindrical body.

However, in the configuration disclosed in U.S. Pat. No. 6,637,118, when the scale is expanded or contracted by an environmental change such as a temperature change or a humidity change, the scale is deflected or a stress is applied to the scale, and therefore a shape of a reflection surface in a signal detection effective region of the scale may be deformed. When the deflection of the scale or the deformation of the scale surface is generated, a detection position (a detection radius position of the cylindrical body) by the sensor unit is changed, and therefore a detection rotational angle of the cylindrical body contains an error. In the optical encoder, by the change of the angle of the scale surface caused by the deflection of the scale or the deformation of the shape of the scale surface, an optical path of the light source, the scale surface, and the sensor is shifted from an ideal optical path. This shift of the optical path causes an error of the detection position in a circumferential direction of the cylindrical body.

Thus, when the deflection of the scale or the deformation of the shape of the scale surface (the expansion or the contraction of the scale) is generated by the change of the environmental condition, a detection accuracy of the encoder is deteriorated by the detection error of the rotational angle of the cylindrical body.

SUMMARY OF THE INVENTION

The present invention provides an encoder, a lens apparatus, and a camera capable of detecting a displacement of an object to be measured with high accuracy even when a scale is expanded or contracted by a change of an environmental condition.

An encoder as one aspect of the present invention includes a cylindrical body, a detector configured to detect a displacement of the cylindrical body in a circumferential direction of the cylindrical body, and a scale that is attached to the cylindrical body using a first holder and a second holder and that has a signal detection effective region used to detect the displacement by the detector, and a region that has a stiffness smaller than a stiffness of the signal detection effective region in the circumferential direction of the cylindrical body is provided on an outside of the signal detection effective region and on at least one side of the first holder and the second holder.

A lens apparatus as another aspect of the present invention includes a lens configured to be movable in an optical axis direction, a cylindrical body configured to rotate along with the lens around an optical axis, a detector configured to detect a displacement of the cylindrical body in a circumferential direction of the cylindrical body, and a scale that is attached to the cylindrical body using a first holder and a second holder and that has a signal detection effective region used to detect the displacement by the detector, and a region that has a stiffness smaller than a stiffness of the signal detection effective region in the circumferential direction of the cylindrical body is provided on an outside of the signal detection effective region and on at least one side of the first holder and the second holder.

A camera as another aspect of the present invention includes a lens configured to be movable in an optical axis direction, an image pickup element configured to perform a photoelectric conversion of an object from the lens, a cylindrical body configured to rotate along with the lens around an optical axis, a detector configured to detect a displacement of the cylindrical body in a circumferential direction of the cylindrical body, and a scale that is attached to the cylindrical body using a first holder and a second holder and that has a signal detection effective region used to detect the displacement by the detector, and a region that has a stiffness smaller than a stiffness of the signal detection effective region in the circumferential direction of the cylindrical body is provided on an outside of the signal detection effective region and on at least one side of the first holder and the second holder.

Further features and aspects of the present invention will become apparent from the following description of exemplary embodiments with reference to the attached drawings.

BRIEF DESCRIPTION OF THE DRAWINGS

FIGS. 5A and 5B are configuration diagrams of yet another encoder in Embodiment 1.

FIG. 6 is a configuration diagram of an encoder in Embodiment 2.

FIGS. 9A to 9D are configuration diagrams of an encoder in Embodiment 3.

DESCRIPTION OF THE PREFERRED EMBODIMENTS

Figure 1A:
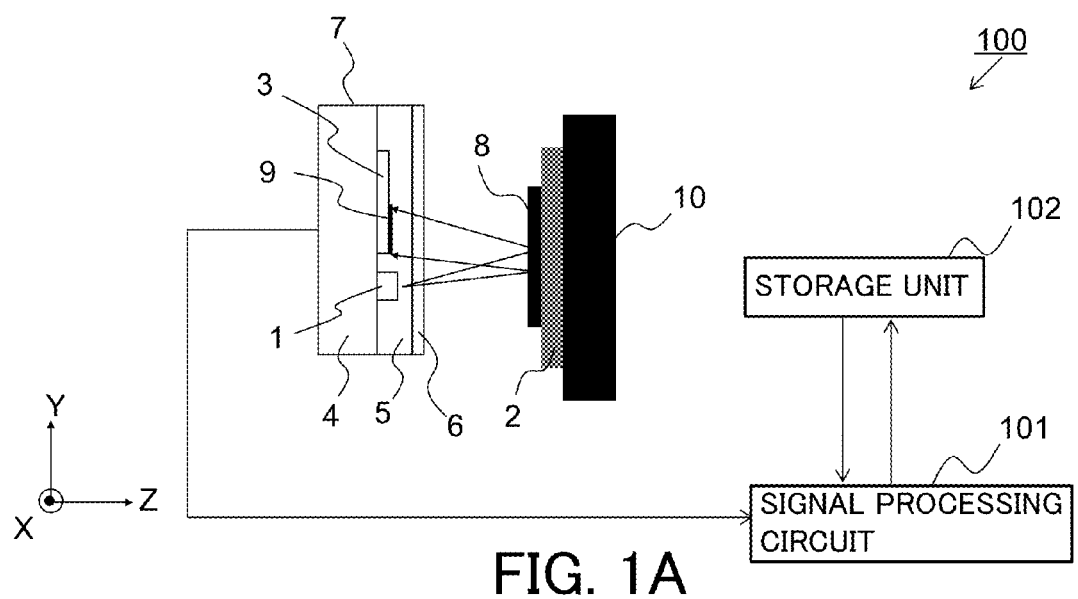
FIGS. 1A and 1B are schematic configuration diagrams of an encoder in each of embodiments.

Exemplary embodiments of the present invention will be described below with reference to the accompanied drawings. In each of the drawings, the same elements will be denoted by the same reference numerals and the duplicate descriptions thereof will be omitted.

Figure 1B:
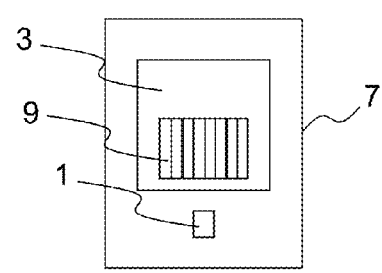

First of all, referring to FIGS. 1A and 1B, a configuration of an encoder in the present embodiment will be described. FIGS. 1A and 1B are schematic configuration diagram of an encoder 100 in the present embodiment, and FIG. 1A illustrates a configuration diagram of an encoder 100, and FIG. 1B illustrates a front view of a sensor unit 7 in the encoder 100.

The encoder 100 is configured by including a cylindrical body 10 that is a movable portion, a scale 2 that is attached to the cylindrical body 10, a sensor unit 7 (a detector) that is attached to a fixed portion, a signal processing circuit 101, and a storage unit 102. The sensor unit 7 detects a displacement of the cylindrical body 10 in a circumferential direction of the cylindrical body 10 to output an encoder signal (a detection signal). The signal processing circuit 101 performs an interpolation processing of an encoder signal obtained by the sensor unit 7, writes a signal into and reads a signal from the storage unit 102, outputs a position signal, and so on. The present embodiment describes a reflective optical encoder, but is not limited to this. The present embodiment can also be applied to a transmissive encoder or a magnetic encoder.

The sensor unit 7 includes a light source 1 that has an LED and a light receiving element 3 that has a light receiving element array 9. The light receiving element 3 (or another semiconductor device) is provided with a signal processing circuit portion (a photo IC chip) that performs a signal processing such as a photoelectric conversion for light received by the light receiving element array 9. The light source 1 and the light receiving element 3 are mounted on a printed circuit board 4, which is sealed with a resin 5. A transparent glass substrate 6 is mounted on the resin 5. Thus, the sensor unit 7 is a sensor unit that is configured by packaging these members and that is integrally configured by including a light receiving element and a light emitting element.

The sensor unit 7 is arranged so as to face (be opposed to) the scale 2. A divergent light beam emitted from the light source 1 in the sensor unit 7 is illuminated on a scale track 8 of the scale 2. A light beam reflected on the scale track 8 is reflected towards the light receiving element array 9 in the sensor unit 7. A distribution of the reflectance of the light beams from the scale track 8 is received as an image on the light receiving element array 9. The light beam received by the light receiving element array 9 is converted into an electric signal (a photoelectric conversion), and is sent as an encoder signal (a detection signal) from the sensor unit 7 to the signal processing circuit 101.

Figure 2A:
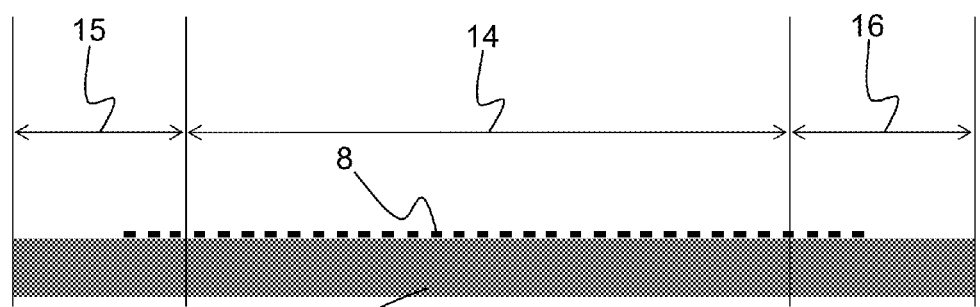
FIGS. 2A and 2B are configuration diagrams of a scale in each of the embodiments.
Figure 2B:
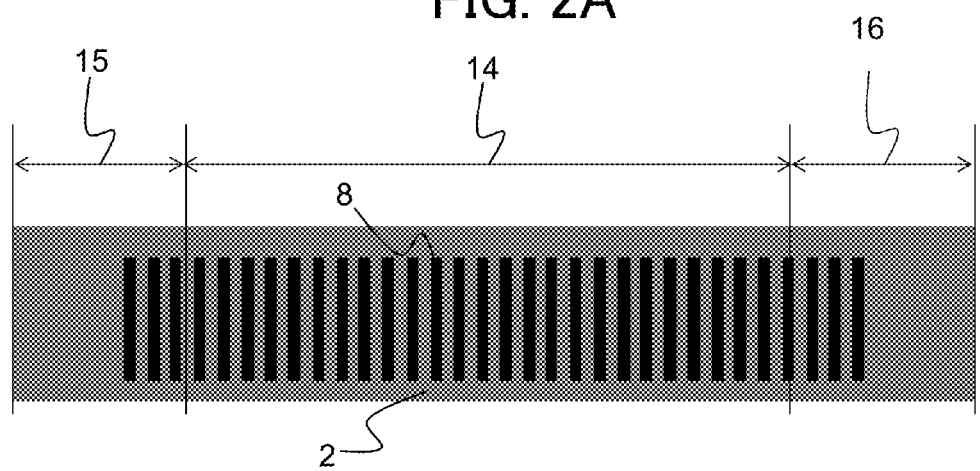

Next, referring to FIGS. 2A and 2B, a configuration of the scale 2 in the present embodiment will be described. FIG. 2 is a configuration diagram of the scale 2, and FIGS. 2A and 2B illustrate a cross-sectional view and a top view of the scale 2, respectively. The scale 2 of the present embodiment is, for example, configured by a flexible base material such as a polycarbonate. A patterning of a reflective film made of aluminum is performed as the scale track 8. As the base material of the scale 2, a metal such as SUS may be used, and as the reflective film, another film such as chrome may also be used.

As illustrated in FIGS. 2A and 2B, the scale 2 includes a signal detection effective region 14 that is used to detect the displacement of an object to be measured by the sensor unit 7, and holding regions 15 and 16 that are provided at both ends of the signal detection effective region 14. The scale 2 is attached to the cylindrical body 10 in the holding regions 15 and 16 using holders 12 and 13 described below. Additionally, in the present embodiment, a region which has a stiffness smaller than a stiffness of the signal detection effective region 14 in the circumferential direction of the cylindrical body 10 is provided on an outside of the signal detection effective region 14 and on at least one side of the holders 12 and 13.

In the embodiment, the meaning that the stiffness in the circumferential direction of (one side of) the holders outside the signal detection effective region is smaller than the stiffness of the signal detection effective region is as follows. When a force is applied to the scale by a temperature change or a stress (and a stress change) that is generated on the holder, the signal detection effective region does not substantially change so as to keep a shape along an inner surface of the cylindrical body, and relatively, the outside of the signal detection effective region is significantly deformed. In other words, the signal detection effective region is not configured so as to be deformed (bent) towards an inner side (a center side) of the cylindrical body separately from the inner surface of the cylindrical body even when it is expanded or contracted along the inner surface of the cylindrical body so as to slightly move. Conversely, a configuration in which the influence caused by the expansion or the contraction of the signal detection effective region is absorbed by a portion outside the effective region is adopted. Specifically, the portion outside the effective region may be configured to be deformable (an elastic deformation can be performed) in the circumferential direction of the cylindrical body, or it may be configured to be deformable towards the outside of the cylindrical body. According to this configuration, since the signal detection effective region does not substantially separate from the inner surface of the cylindrical body, a significant deterioration of a position detection performance caused by the influence of the expansion or the contraction of the signal detection effective region can be prevented.

In the embodiment, the stiffness means a value that is obtained by dividing a load applied to the scale by an amount of change of the length of the scale along an inner circumference surface or an outer circumferential surface of the cylindrical body. Accordingly, the strength is high if this value is large, and on the other hand the strength is low if this value is small. The length of the scale is a length along the inner circumferential surface or the outer circumferential surface of the cylindrical body, and the length changes in accordance with the expansion or the contraction of the scale, and thus the length in a direction along the inner circumferential surface or the outer circumferential surface is only considered even when the scale is deformed in a direction different from the direction along the inner circumferential surface or the outer circumferential surface.

Hereinafter, referring to Embodiments 1 to 4, specific examples of the region that has stiffness smaller than that of the signal detection effective region 14 will be described. In each embodiment, a region which has the small stiffness is a region that is configured so as easily to expand and contract in the circumferential direction since the stiffness is small, which is also referred to as an absorbing portion (an expansion and contraction absorbing portion) that absorbs the expansion and the contraction in the circumferential direction of the signal detection effective region 14 of the scale 2.

(Embodiment 1)

Figure 3:
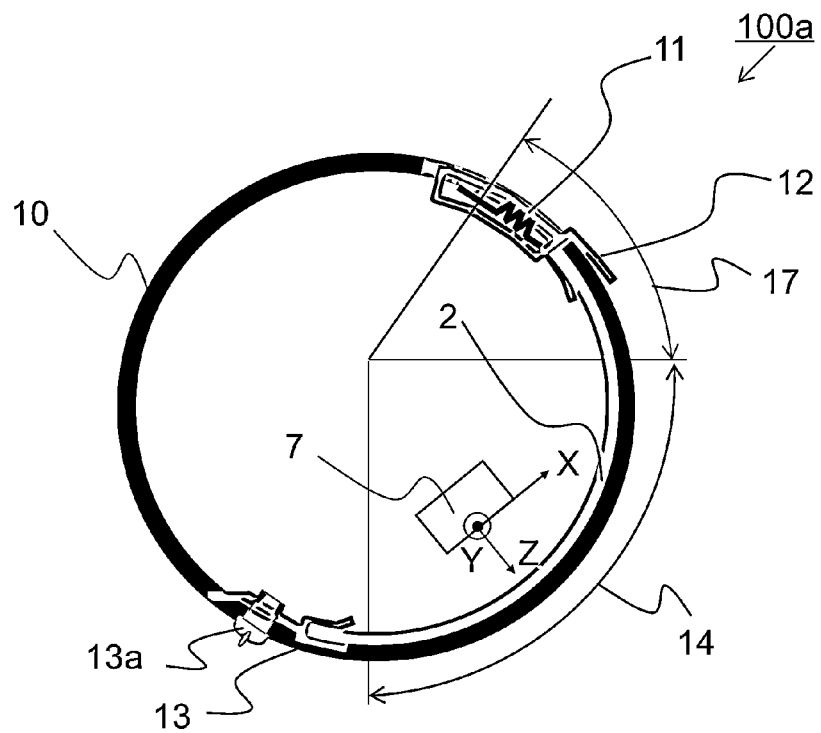
FIG. 3 is a configuration diagram of an encoder in Embodiment 1.

Referring to FIG. 3, an attachment structure of the scale 2 and the cylindrical body 10 in an encoder 100a of Embodiment 1 will be described. FIG. 3 is a configuration diagram of the encoder 100a. As illustrated in FIG. 3, in the present embodiment, the scale 2 is attached to the inner surface of the cylindrical body 10. The sensor unit 7 is arranged inside the cylindrical body 10 so as to face the scale 2.

At one end of the scale 2, an elastic member 11 is disposed via the holder 12 (a first holder). Therefore, the one end of the scale 2 is capable of moving by at least predetermined amount in the circumferential direction. The other end of the scale 2 is fixed via the holder 13 (a second holder) using a screw 13a. The elastic member 11 is configured so that the stiffness of the elastic member 11 in the circumferential direction of the cylindrical body 10 is smaller than the stiffness of the scale 2 (the signal detection effective region 14 of the scale 2). In other words, a region 17 that has a small stiffness is provided outside the signal detection effective region 14 of the scale 2. In the present embodiment, the elastic member 11 is only disposed at the one end of the scale 2, but the embodiment is not limited to this. The elastic members 11 may also be disposed at both ends of the scale 2. Thus, in the present embodiment, the region having the stiffness smaller than the stiffness of the signal detection effective region 14 (the region 17 that has small stiffness) is the elastic member 11 that is provided on at least one of the holders 12 and 13 of the scale 2.

In the present embodiment, the scale 2 or the cylindrical body 10 is expanded or contracted by thermal expansion or moisture absorption that is generated by an environmental change such as a temperature change or a humidity change. When the scale 2 is contracted relative to the cylindrical body 10, the scale 2 is deflected (bends). Therefore, the scale 2 may contact the sensor unit 7, or the scale 2 may float from the cylindrical body 10. When the scale 2 is expanded relative to the cylindrical body 10, the stress is applied to the scale 2 and the shape of the reflection surface of the signal detection effective region 14 may be deformed.

In the present embodiment, the elastic member 11 is provided on at least one of both the ends of the scale 2. Therefore, when the scale 2 is expanded or contracted relative to the cylindrical body 10, the elastic member 11 expands or contracts in accordance with the motion of the scale 2. According to this configuration, since an amount of expansion or contraction of the scale 2 with respect to the cylindrical body 10 can be reduced, the deflection (the flexure) or the deformation of the scale 2 can be reduced. In other words, providing the elastic member 11, a surface accuracy of the scale 2 can be ensured. As a result, a highly-accurate encoder can be provided in a wide range of environmental conditions.

Figure 4:
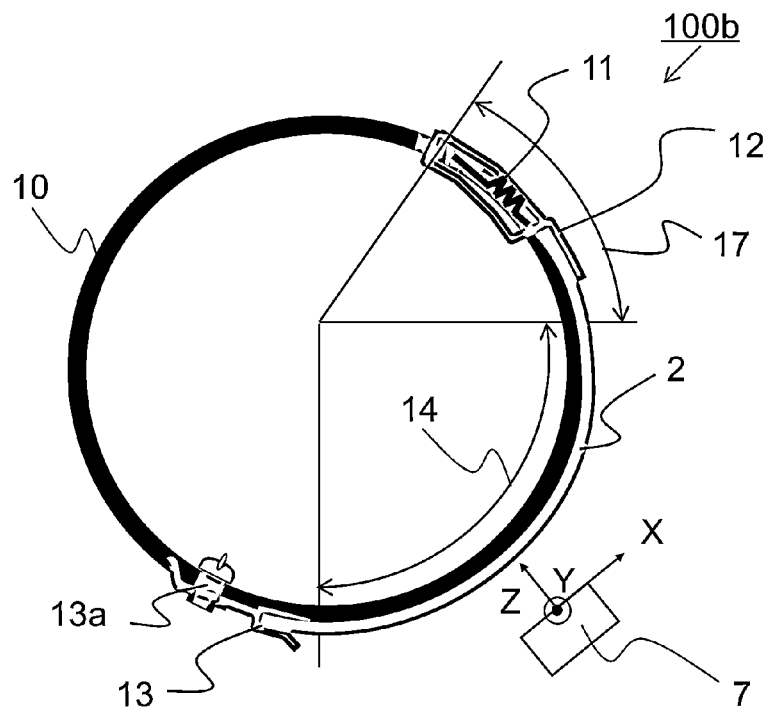
FIG. 4 is a configuration diagram of another encoder in Embodiment 1.

Subsequently, referring to FIG. 4, an attachment structure of another encoder 100b in the present embodiment will be described. FIG. 4 is a configuration diagram of the encoder 100b. As illustrated in FIG. 4, the scale 2 is attached to an outer surface of the cylindrical body 10, and a tension is applied to the scale 2 by the elastic member 11. The sensor unit 7 is arranged outside the cylindrical body 10 so as to face the scale 2, which detects a displacement of the cylindrical body 10 that is an object to be measured. Also in the configuration of FIG. 4, when the scale 2 is expanded or contracted by the environmental change, the elastic member 11 expands or contracts in accordance with the motion of the scale 2. Therefore, similarly to the configuration of FIG. 3, a highly-accurate encoder can be provided in a wide range of the environmental conditions.

Subsequently, referring to FIGS. 5A and 5B, an attachment structure of yet another encoder 100c in the present embodiment will be described. FIGS. 5A and 5B are configuration diagrams of the encoder 100c, and FIGS. 5A and 5B illustrates s cross-sectional view and a perspective view of the encoder 100c (the cylindrical body 10), respectively. The scale 2 of the encoder 100c is attached to the inner surface of the cylindrical body 10 so as to face the outside using the elastic member 11. The sensor unit 7 is arranged outside the cylindrical body 10. As illustrated in FIG. 5B, the cylindrical body 10 is provided with a window 18, and the scale 2 and the sensor unit 7 are arranged so as to face each other via the window 18. Therefore, the sensor unit 7 can detect an encoder signal from the signal detection effective region 14 of the scale 2.

In the optical encoder, in order to obtain the encoder signal, a distance of around 1 mm between the scale 2 and the sensor unit 7 needs to be ensured. In this regard, according to the configuration of the present embodiment, since the sensor unit 7 can be arranged to be closer to the scale 2, a smaller optical encoder can be provided. Also in a configuration (not shown) where the scale 2 is attached to the outer surface of the cylindrical body 10 so as to face the inner side and the sensor 7 is arranged inside the cylindrical body 10, the effect similar to the encoder 100c illustrated in FIGS. 5A and 5B can be obtained.

Recently, in a field of the encoder, an absolute encoder is advancing. The absolute encoder has an advantage that a movement to a home position is not necessary when the power is turned on or after recovering from a case where the power is turned off. In the absolute encoder, for example, a plurality of scale tracks need to be configured, and a synchronization of information from the plurality of scale tracks is important. Therefore, in connection with a calculation processing step in obtaining absolute information, a position of the scale needs to be ensured with higher accuracy in a direction of the plurality of scale tracks that is perpendicular to a displacement direction, as well as the displacement direction of the scale relative to the sensor unit. In other words, in the absolute encoder, an attachment of the scale in which a higher surface accuracy can be achieved is required. In this regard, the attachment structure of the scale in the present embodiment can be used more appropriately.

(Embodiment 2)

Next, referring to FIGS. 6 to 8, an attachment structure of the scale 2 and the cylindrical body 10 in an encoder of Embodiment 2 will be described. FIG. 6 is a configuration diagram of an encoder 100d in the present embodiment, which illustrates a configuration in which the scale 2 is attached to the inner surface of the cylindrical body 10. Similarly to Embodiment 1, the scale 2 may also be attached to the outer surface of the cylindrical body 10. In the present embodiment, the region that has the stiffness smaller than the stiffness of the signal detection effective region 14 is configured so that the stiffness in the circumferential direction of a scale portion of at least one of the holders 12 and 13 of the scale 2 is smaller than the stiffness of the signal detection effective region 14. In the present embodiment, the holder 12 is provided to be fixed with the screw 12a on a side of the region 17 that has the small stiffness of the scale 2. The stiffness of apart of the scale 2 outside the signal detection effective region 14 is set to be smaller than stiffness of the signal detection effective region 14, and thus an effect similar to that of Embodiment 1 can be achieved.

Figure 7:
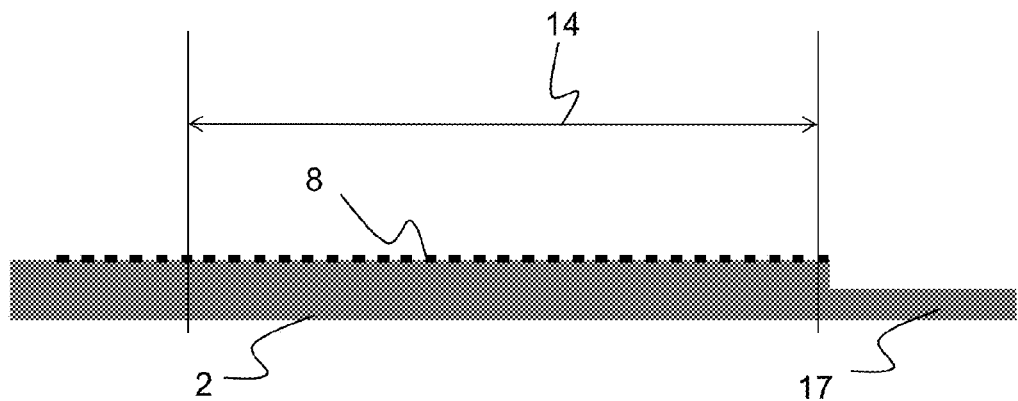
FIG. 7 is a configuration diagram of a scale in Embodiment 2.
Figure 8:
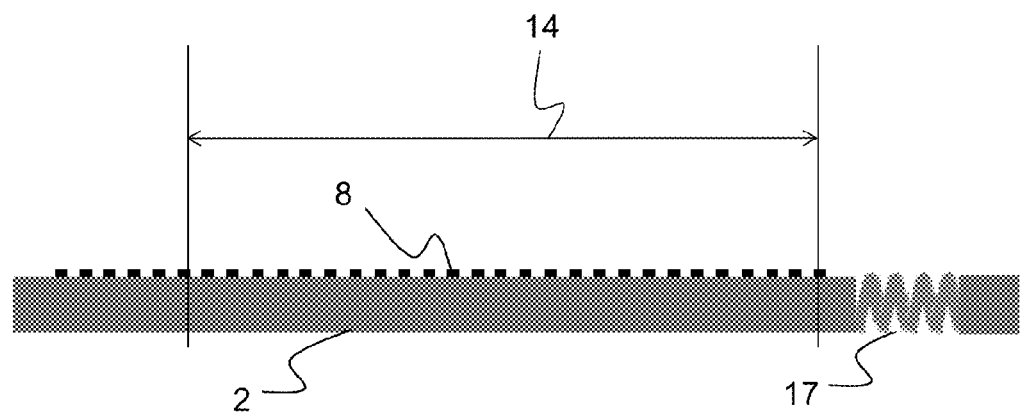
FIG. 8 is a configuration diagram of another scale in Embodiment 2.

FIGS. 7 and 8 are configuration diagrams of the scale 2 in the present embodiment, which illustrate configuration examples different from each other. In FIG. 7, a thin-plate portion that is configured by setting a thickness of at least apart of the holding region 16 thinner than a thickness of the signal detection effective region 14 is provided, and thus a region that has the stiffness smaller than the stiffness of the signal detection effective region 14 (the region 17 that has the small stiffness) is configured. On the other hand, in FIG. 8, at least a part of the holding region 16 of the scale 2 is configured so as to have an accordion shape (an accordion portion), and thus the region that has the stiffness smaller than the stiffness of the signal detection effective region 14 (the region 17 that has the small stiffness) is configured.

In the present embodiment, when the scale is expanded or contracted, the region 17 that has the small stiffness of a part of the scale 2 itself in the circumferential direction of the cylindrical body 10 expands or contracts greatly compared to the signal detection effective region 14 of the scale 2. Therefore, even when the scale 2 is expanded or contracted by the environmental change, the influence of the deformation of the shape (the shape of the reflection surface) of the signal detection effective region 14 caused by the deflection of the scale 2 or the stress applied to the scale 2 can be reduced. As a result, similarly to the case of Embodiment 1, a highly-accurate encoder can be provided in a wide range of the environmental conditions.

(Embodiment 3)

Next, referring to FIGS. 9A to 9D, an attachment structure of the scale 2 and the cylindrical body 10 in an encoder of Embodiment 3 will be described. FIGS. 9A to 9D are configuration diagrams of an encoder 100e, and FIGS. 9A and 9B illustrate a cross-sectional view and a perspective view of the encoder 100e (the cylindrical body 10), respectively.

As illustrated in FIG. 9B, a part of the cylindrical body 10 is provided with a hole 19 (a space). A part of the outside of the signal detection effective region 14 of the scale 2 can be inserted into the hole 19. According to this configuration, a region that can be inserted into the hole 19 has the stiffness in the circumferential direction of the scale 2 that is smaller than the stiffness of the signal detection effective region 14. In other words, in the present embodiment, the region that has the stiffness smaller than that of the signal detection effective region 14 (the region 17 that has the small stiffness) is configured so as to form the hole 19 on a part of the cylindrical body 10 of the outside of the signal detection effective region 14 and at least one side of the holders 12 and 13.

Subsequently, referring to FIGS. 9C and 9D, a case where the scale 2 is expanded or contracted in the encoder 100e of the present embodiment will be described. FIGS. 9C and 9D illustrate areas around the holder 12 in the cases where the scale 2 is expanded and contracted, respectively. In the present embodiment, when the scale is expanded or contracted by the environmental change or the like, as indicated by arrows illustrated in FIGS. 9C and 9D, the scale 2 is inserted into the hole 19 and a length (a length in the circumferential direction) of the outside of the signal detection effective region 14 of the scale 2 is changed. In the present embodiment, the thickness of the scale 2 is uniform, but as illustrated in FIG. 7 of Embodiment 2, thinning the thickness of one end of the scale 2, the effect of the present embodiment can be more remarkable.

In the present embodiment, even when the scale 2 is expanded or contracted by the environmental change, the influence of the deformation of the shape (the shape of the reflection surface) of the signal detection effective region 14 caused by the deflection of the scale 2 or the stress applied to the scale 2 can be reduced. As a result, similarly to the cases of Embodiments 1 and 2, a highly-accurate encoder can be provided in a wide range of environmental conditions.

(Embodiment 4)

Figure 10A:
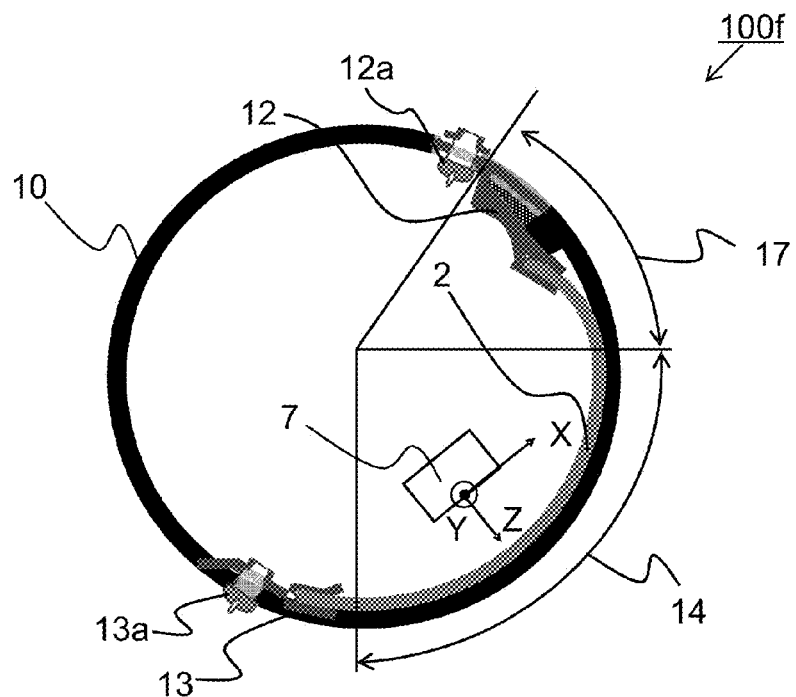
FIGS. 10A to 10C are configuration diagrams of an encoder in Embodiment 4.
Figures 10B, 10C:
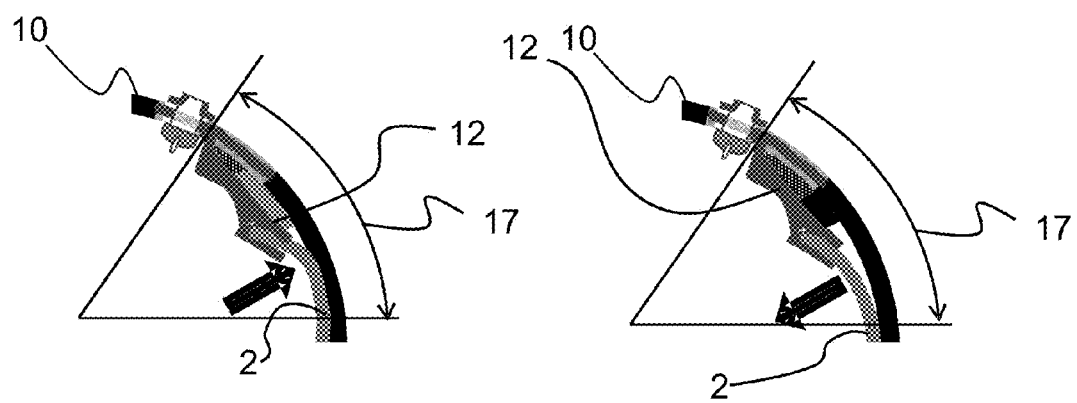

Next, referring to FIGS. 10A to 10C, an attachment structure of a scale 2 and a cylindrical body 10 in an encoder of Embodiment 4 will be described. FIGS. 10A to 10C are configuration diagrams of an encoder 100f, and FIG. 10A illustrates a configuration in which the scale 2 is attached to the inner surface of the cylindrical body 10. The holder 12 that holds the scale 2 has a bending portion that is configured so as to bend the scale 2 towards the inside of the cylinder body 10. Thus, the scale 2 is bent towards the inside of the cylinder body 10. According to this configuration, the stiffness of the scale 2 in the circumferential direction in the bent region is smaller than that in the signal detection effective region 14. In other words, in the present embodiment, the region that has the stiffness smaller than the stiffness of the signal detection effective region 14 is configured so as to form the bending portion that is used to bend the scale portion to the inside of the cylindrical body 10 on the outside of the signal detection effective region 14 and on at least one of the holders 12 and 13.

Subsequently, referring to FIGS. 10B and 10C, in the present embodiment, cases in which the scale 2 is expanded and contracted will be described. FIGS. 10B and 10C illustrate areas around the holder 12 in the cases where the scale 2 is expanded and contracted, respectively. In the present embodiment, when the scale is expanded or contracted by the environmental change or the like, as indicated by arrows illustrated in FIGS. 10B and 10C, a length (a length in the circumferential direction) of contacting the scale 2 with the cylindrical body 10 in the bent region is changed.

In the present embodiment, the thickness of the scale 2 is uniform, but as illustrated in FIG. 7 of Embodiment 2, thinning the thickness of one end of the scale 2, the effect of the present embodiment can be more remarkable. As a result, similarly to the cases of Embodiments 1 to 3, a highly-accurate encoder can be provided in a wide range of environmental conditions.

(Embodiment 5)

Figure 11:
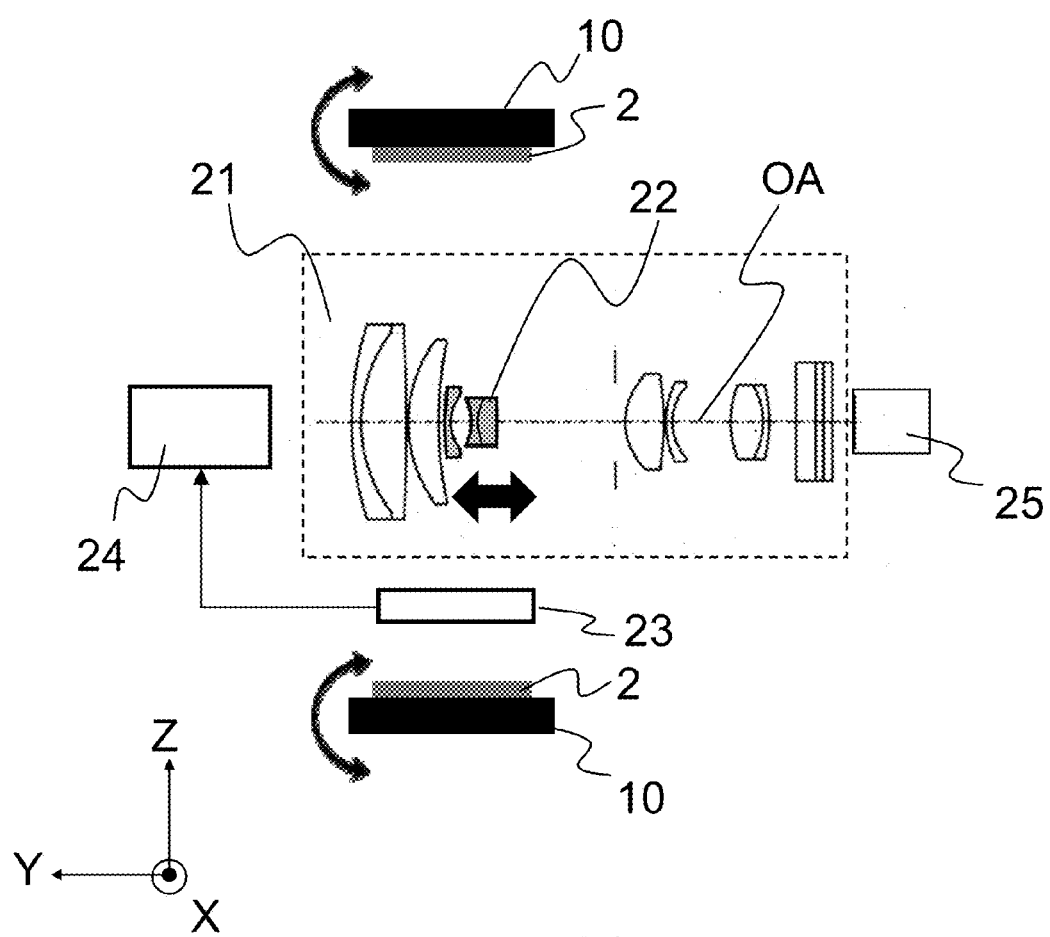
FIG. 11 is a schematic configuration diagram of a lens apparatus in Embodiment 5.

Next, referring to FIG. 11, a lens apparatus (a lens barrel of an image pickup apparatus) that mounts the encoder 100 will be described. FIG. 11 is a schematic configuration diagram of the image pickup apparatus (a camera) in the present embodiment.

In FIG. 11, reference numeral 21 denotes a lens unit, reference numeral 22 denotes a drive lens (a lens), reference numeral 23 denotes a sensor unit, reference numeral 24 denotes a CPU, and reference numeral 25 denotes an image pickup element. The image pickup element 25 performs a photoelectric conversion of an object image from the lens unit 21 (the drive lens 22). The lens unit 21, the sensor unit 23, and the CPU 24 are provided in the lens apparatus, and the image pickup element 25 is provided in an image pickup apparatus body. Thus, the lens apparatus of the present embodiment is configured to be interchangeable for the image pickup apparatus body. However, the present embodiment is not limited to this, and can also be applied to an image pickup apparatus (a camera) that is integrally configured by the lens apparatus and the image pickup apparatus body.

The drive lens 22 that constitutes the lens unit 21 is for example a focus lens that is used for an auto focus, which is movable in a Y direction that is a direction of an optical axis OA (an optical axis direction). Alternatively, the drive lens 22 may also be another drive lens such as a zoom lens. The cylindrical body 10 that has the attachment structure of the scale in each of the above embodiments is coupled to an actuator (not shown) that drives the drive lens 22.

When the cylindrical body 10 is rotated around the optical axis by an actuator or by hand, the scale 2 is displaced relative to the sensor unit 23. In accordance with this displacement, the drive lens 22 moves in the Y direction (an arrow direction) that is the optical axis direction. A signal depending on the displacement of the drive lens 22 obtained from the sensor unit 23 of the encoder (the encoder signal) is outputted to the CPU 24. A drive signal to move the drive lens 22 to a desired position is generated by the CPU 24, and the drive lens 22 is driven based on the drive signal.

The drive lens 22, commonly, has an optical sensitivity with respect to a displacement that is different in accordance with a position. Since the holder 13 is fixed to the cylindrical body 10 using the screw 13a, its moving amount is extremely small compared to the movement of the holder 12 even if it moves. As a result, a shift amount from a reference position that is caused by the expansion or the contraction of the scale at a side of the holder 12 (at a region where the stiffness is small) is larger than a shift amount at a side of the holder 13. Therefore, it is preferred that the holder 12 of the attachment structure of the scale in each of the above embodiments is allocated at a position where the optical sensitivity is low. In other words, the region that has the stiffness smaller than stiffness of the signal detection effective region 14 (the region 17 that has the small stiffness) is provided at one of the holders 12 and 13 where the optical sensitivity with respect to the displacement of the drive lens 22 is lower than the other one.

For example, when the drive lens 22 is the zoom lens, commonly, the zoom lens is designed to have an optical sensitivity with respect to a position change of the zoom lens when the zoom lens is arranged at a wide angle side lower than the optical sensitivity when the zoom lens is arranged at a telephoto side in many cases. In this case, it is preferred that the wide angle side of the zoom lens is arranged at the side of the holder 13 (at the side of the region 17 that has the small stiffness) in the attachment structure of the scale in each of the above embodiments. On the other hand, when a region where the optical sensitivity with respect to the position change of the zoom lens is high is positioned in the middle of the telephoto side and the wide angle side, a configuration where both the telephoto side and the wide angle side are the elastic end (the region that has the small stiffness) can also be adopted. The encoder of each of the above embodiments can also be applied to various kinds of apparatuses such as a displacement detection apparatus of a robot arm, as well as the image pickup apparatus (the camera, or the lens apparatus).

According to each of the above embodiments, even when the scale is expanded or contracted by the environmental change, the influence of the deformation of the shape (the shape of the reflection surface) of the signal detection effective region caused by the deflection of the scale or the stress applied to the scale can be reduced. Therefore, an encoder, a lens apparatus, and a camera capable of detecting a displacement of an object to be measured can be provided even when a scale is expanded or contracted by the change of the environmental condition.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-103984, filed on Apr. 27, 2012, which is hereby incorporated by reference herein in its entirety.

What is claimed is:

1. An encoder comprising:
   a cylindrical body;
   a detector configured to detect a displacement of the cylindrical body in a circumferential direction of the cylindrical body;
   a scale attached to an inner surface of the cylindrical body, and including a first end portion, a second end portion opposite to the first end portion, and a signal detection effective region used to detect the displacement by the detector, the signal detection effective region being provided between the first and second end portions;
   a first holder configured to apply an elastic force to the first end portion, from the first end portion, toward the second end portion; and
   a second holder configured to fix the second end portion to the cylindrical body so that the second end portion does not move relative to the cylindrical body.

2. The encoder according to claim 1, wherein the first holder includes an elastic member that is configured to expand or contract depending on expansion or contraction of the scale relative to the cylindrical body.

3. The encoder according to claim 1, wherein the first holder is configured to absorb expansion and contraction in the circumferential direction of the signal detection effective region of the scale.

4. The encoder according to claim 1, wherein:
   the first holder holds the first end portion so as to be movable in the circumferential direction along the curvature of the cylindrical body, and
   the second holder holds the second end portion so as to not move the second end portion in the circumferential direction.

5. The encoder according to claim 1, wherein:
   the first holder includes an elastic member,
   the second holder holds the scale using a screw, and
   the elastic member is configured to expand or contract depending on expansion or contraction of the scale relative to the cylindrical body.

6. A lens apparatus comprising:
   a lens configured to be movable in an optical axis direction;
   a cylindrical body configured to rotate along with the lens around an optical axis;
   a detector configured to detect a displacement of the cylindrical body in a circumferential direction of the cylindrical body;
   a scale attached to an inner surface of the cylindrical body, and including a first end portion, a second end portion opposite to the first end portion, and a signal detection effective region used to detect the displacement by the detector, the signal detection effective region being provided between the first and second end portions;
   a first holder configured to apply an elastic force to the first end portion, from the first end portion, toward the second end portion; and
   a second holder configured to fix the second end portion to the cylindrical body so that the second end portion does not move relative to the cylindrical body.

7. The lens apparatus according to claim 6, wherein an optical sensitivity for a displacement of the lens at the first end portion is lower than an optical sensitivity of the second end portion.

8. The lens apparatus according to claim 7, wherein the first holder is provided at a wide angle side of the lens.

9. A camera comprising:
   a lens configured to be movable in an optical axis direction;
   an image pickup element configured to perform a photoelectric conversion of an object from the lens;
   a cylindrical body configured to rotate along with the lens around an optical axis;
   a detector configured to detect a displacement of the cylindrical body in a circumferential direction of the cylindrical body;

a scale attached to an inner surface of the cylindrical body, and including a first end portion, a second end portion opposite to the first end portion, and a signal detection effective region used to detect the displacement by the detector, the signal detection effective region being provided between the first and second end portions;

a first holder configured to apply an elastic force to the first end portion, from the first end portion, toward the second end portion; and a second holder configured to fix the second end portion to the cylindrical body so that the second end portion does not move relative to the cylindrical body.

10. An encoder comprising:

a cylindrical body;

a detector configured to detect a displacement of the cylindrical body in a circumferential direction of the cylindrical body;

a scale attached to an inner surface of the cylindrical body, and including a first end portion, a second end portion opposite to the first end portion, and a signal detection effective region used to detect the displacement by the detector, the signal detection effective region being provided between the first and second end portions;

a first holder configured to hold and bend a vicinity of the first end portion toward a center of the cylindrical body so that a radius of curvature at the vicinity of the first end portion is smaller than a radius of curvature at the signal detection effective region; and a second holder configured to fix the second end portion to the cylindrical body so that the second end portion does not move relative to the cylindrical body.

11. A lens apparatus comprising:

a lens configured to be movable in an optical axis direction;

a cylindrical body configured to rotate along with the lens around an optical axis;

a detector configured to detect a displacement of the cylindrical body in a circumferential direction of the cylindrical body;

a scale attached to an inner surface of the cylindrical body, and including a first end portion, a second end portion opposite to the first end portion, and a signal detection effective region used to detect the displacement by the detector, the signal detection effective region being provided between the first and second end portions;

a first holder configured to hold and bend a vicinity of the first end portion toward a center of the cylindrical body so that a radius of curvature at the vicinity of the first end portion is smaller than a radius of curvature at the signal detection effective region; and a second holder configured to fix the second end portion to the cylindrical body so that the second end portion does not move relative to the cylindrical body.

12. A camera comprising:

a lens configured to be movable in an optical axis direction;

an image pickup element configured to perform a photoelectric conversion of an object image from the lens;

a cylindrical body configured to rotate along with the lens around an optical axis;

a detector configured to detect a displacement of the cylindrical body in a circumferential direction of the cylindrical body;

a scale attached to an inner surface of the cylindrical body, and including a first end portion, a second end portion opposite to the first end portion, and a signal detection effective region used to detect the displacement by the detector, the signal detection effective region being provided between the first and second end portions;

a first holder configured to hold and bend a vicinity of the first end portion toward a center of the cylindrical body so that a radius of curvature at the vicinity of the first end portion is smaller than a radius of curvature at the signal detection effective region; and a second holder configured to fix the second end portion to the cylindrical body so that the second end portion does not move relative to the cylindrical body.

\* \* \* \* \*